(No Model.) 2 Sheets—Sheet 1.
T. R. CRANE.
COMBINED SEED DISTRIBUTER, HARROW, AND ROLLER.
No. 345,214. Patented July 6, 1886.
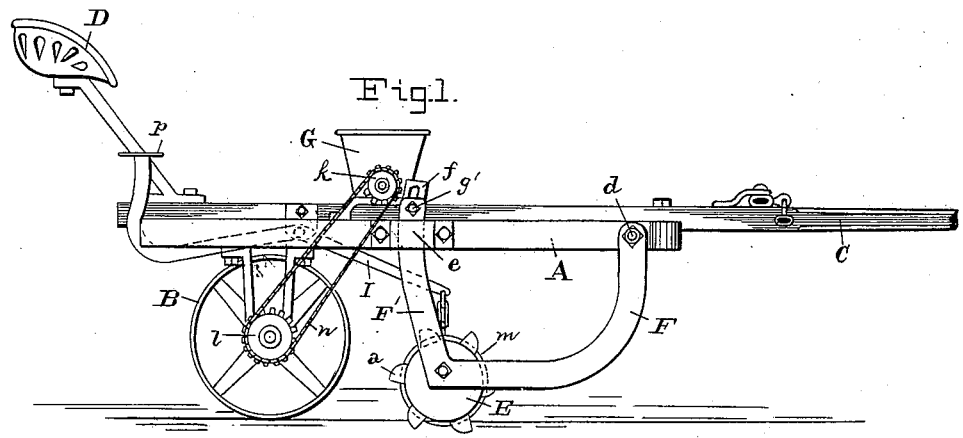
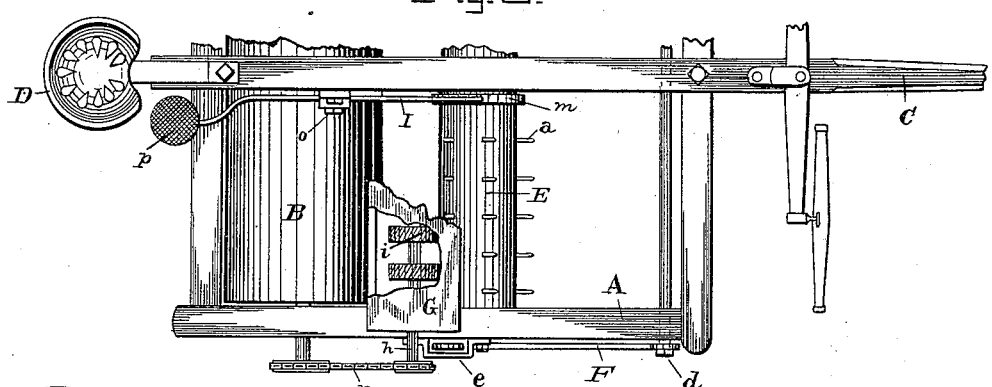
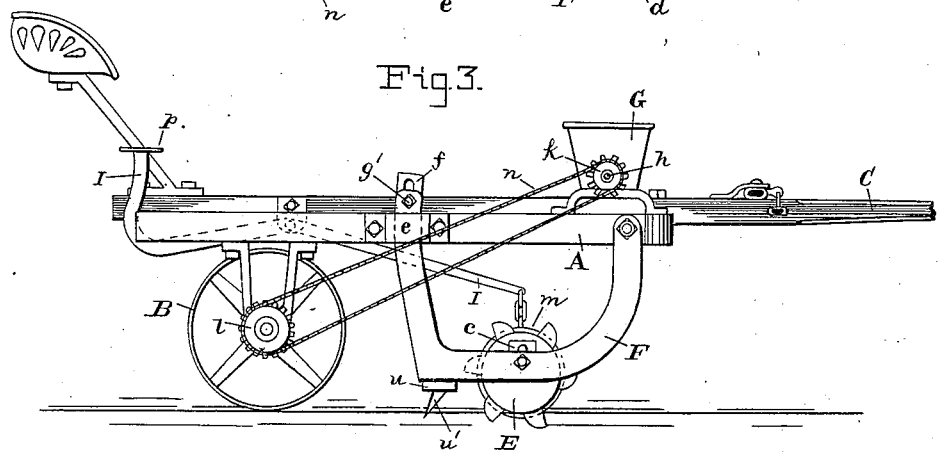
Witnesses:
John E. Morris
A. E. Eader
Inventor:
Thos R Crane
By Chas B. Mann
Attorney

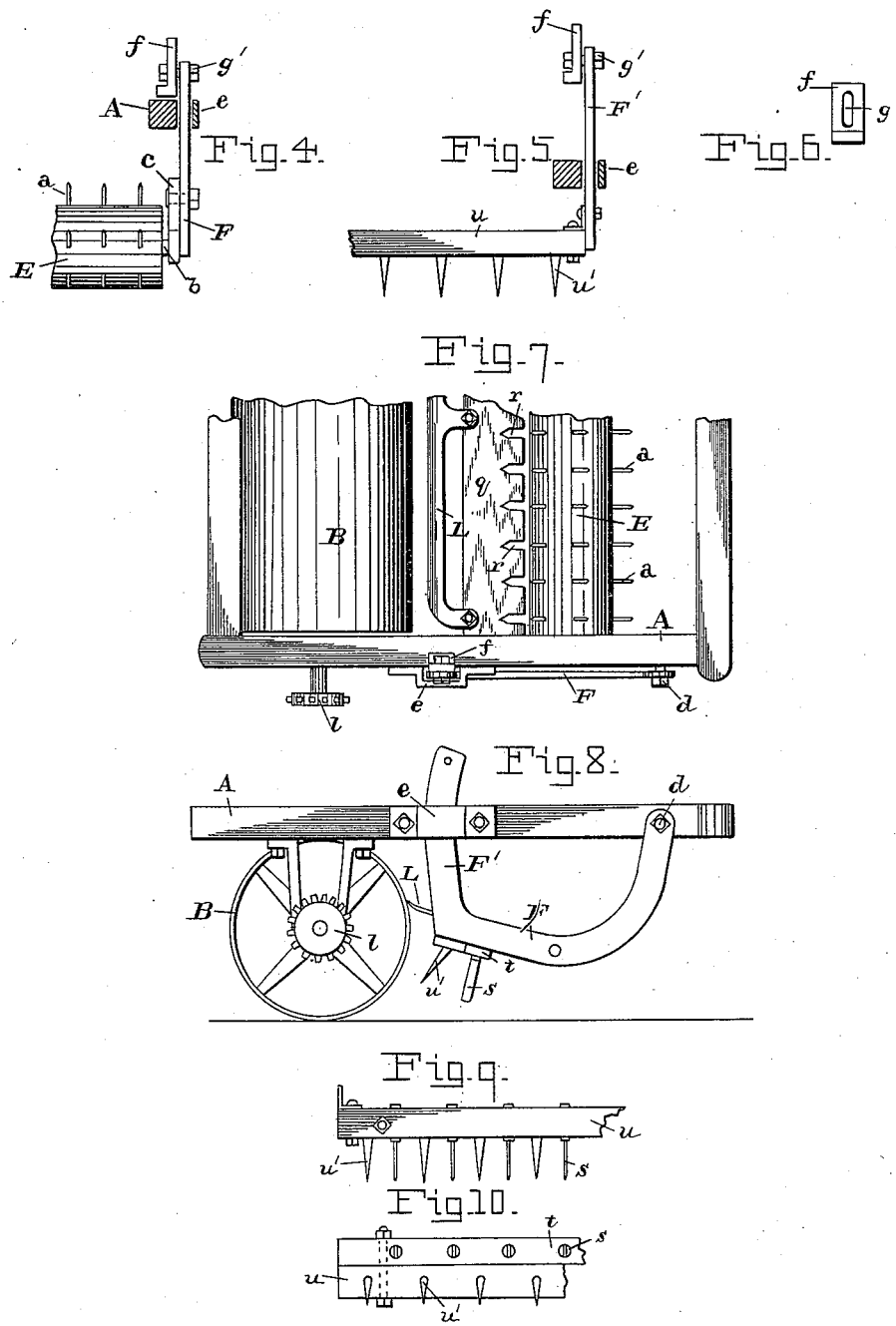

UNITED STATES PATENT OFFICE.

THOMAS R. CRANE, OF HEATHSVILLE, VIRGINIA.

COMBINED SEED-DISTRIBUTER, HARROW, AND ROLLER.

SPECIFICATION forming part of Letters Patent No. 345,214, dated July 6, 1886.

Application filed February 6, 1886. Serial No. 190,961. (No model.)

*To all whom it may concern:*

Be it known that I, THOMAS R. CRANE, a citizen of the United States, residing at Heathsville, in the county of Northumberland and State of Virginia, have invented certain new and useful Improvements in a Combined Seed-Distributer, Harrow, and Roller, of which the following is a specification.

My invention relates to certain improvements in seeding-machines, and has for its object to provide an improved machine for preparing land for seeding.

The invention is illustrated in the accompanying drawings, in which Figure 1 is a side view of the machine as rigged for sowing grass-seed where the land is in certain condition. Fig. 2 is a top view showing one-half of the machine. Fig. 3 is a side view of the machine, embracing a drag-harrow in addition to the parts shown in Fig. 1, and shown rigged for sowing grass-seed where the land is in certain condition. Fig. 4 is a vertical cross-section of one side of the frame, showing the upright bar and the adjustable stop which controls the depth of puncture of the harrow-points. Fig. 5 is a vertical cross-section of one side of the frame, showing the upright bar, drag-harrow, and the adjustable stop in a different position from that seen in Fig. 4. Fig. 6 is a front view of the adjustable stop. Fig. 7 is a top view of one-half of the machine, or so much of it as will best illustrate the prong-cleaners and roller-scraper. Fig. 8 is a side view of the machine, showing the scraper raised to take effect on the roller, and also showing colters in front of the drag-harrow. Figs. 9 and 10 show side and bottom views of the drag-harrow and colters.

The letter A designates the wooden frame, wholly supported by resting upon the journals of a roller, B, which is at the rear of the frame. The pole C is attached to the frame and extends to the rear part thereof, and the seat D is mounted thereon and may be shifted back or forward, so that when a driver occupies the seat the weight of the forward part of the frame will not bear heavily on the necks of the animals.

A rotary harrow consists of a cylinder, E, provided with prongs $a$, which are blade-shaped and have a curved cutting-edge arranged to puncture the soil and avoid tearing up the roots of standing wheat. The journals $b$ of the cylinder have adjustable bearings $c$ on an arm, F, one end of which is pivoted at $d$ to the forward part of the frame A, and a bar, F', projects upright from this arm at the other end. This upward-projecting bar F' passes loosely through a keeper or guide, $e$, fixed on the side of the frame. This guide keeps the bar from lateral movement, but permits it to raise and lower. The upward-projecting bar is provided at its upper end with an adjustable stop, $f$, which serves to limit its down movement without restricting its upward movement. The stop $f$ is right-angled in shape, forming a vertical part and a base or foot part. (See Figs. 4, 5, and 6.) The vertical part has a slot, $g$, and a bolt, $g'$, in the upward-projecting bar passes through the said slot, and thereby clamps the stop to the bar. It will be seen the stop is vertically adjustable on the bar to the extent of the length of the slot. This adjustable stop, in connection with the rotary harrow, enables the operator to regulate the depth to which the blades or prongs $a$ may penetrate the ground. This is important in grass-seeding, as if the seed drop too deeply in the ground they will not germinate. A band or collar, $m$, loosely surrounds the harrow-cylinder at its center, and a treadle-lever, I, is pivoted at $o$ to the frame (or to the tongue C, which extends across the frame.) One end of this lever is connected with the said collar $m$ and the other end near the driver's seat has a foot-plate, $p$. Thereby the driver can raise the harrow from the ground by depressing the foot-plate end of the lever. A grass-seed box, G, is mounted on the frame, and its position thereon may be such as to drop the seed after the revolving harrow, as in Fig. 1, or before the said harrow, as in Fig. 3. A shaft, $h$, extends through the box, and feed devices $i$, of any desired or well-known kind, are operated by the said shaft and cause the grass-seed to be discharged from the box. The end of the shaft $h$ has outside of the box a sprocket-wheel, $k$, and a wheel, $l$, is mounted on one of the roller-journals, and endless chain, $n$, passes around the drive sprocket-wheel $l$ and the wheel $k$. The feed devices are thereby set in motion.

As arranged in Fig. 1, the machine is adapted for reseeding a meadow or sowing grass-seed in the spring of the year on land that was planted in wheat the previous autumn.

As already mentioned, the revolving harrow has its journals $b$ in vertically-adjustable bearings $c$, which are on the pivoted arm F. When the revolving harrow is used in the same frame with a drag-harrow, $u$, as in Fig. 3, this vertical adjustment of the revolving harrow is important. Here both harrows are limited as to their "down movement" by the adjustable stop, $f$, on the upward-projecting bar. This bar should be adjusted so that the drag-teeth $u'$ will scarify the surface of the ground to the desired depth, and then the bearings $c$ of the revolving harrow should be set to correspond with this depth. The importance of this will be seen by recalling the fact that if the cylinder of the revolving harrow were to roll on the ground-surface it would thereby restrict the penetration of the drag-teeth; therefore, the adjustment of the bearings $c$ of the revolving harrow must be such as to prevent the cylinder from resting on the ground.

As arranged in Fig. 3, the machine is adapted for sowing grass-seed where the soil is firm. A scraper, L, is provided, to remove dirt or mud which may adhere to the roller B. This scraper is shown in Figs. 3, 7, and 8, and consists of a plate, L, attached to the harrow-bar $u$ or to any other cross-bar supported on the pivoted arm. When the pivoted arm F, which carries the harrow, is raised, as shown in Fig. 8, while the machine is moving, the scraper-plate comes in contact with the roller B and cleans it.

While scrapers for plow-wheels and cleaners for harrows have been used or proposed heretofore they have not been arranged and combined like the one here shown with a frame, a roller, and an arm pivoted to the frame.

A prong-cleaner is provided for removing grass, dirt, or trash from the prongs or blades $a$ of the rotary harrow. This device is shown in Fig. 7, and consists of a metal plate, $q$, secured to a cross-bar or the harrow-bar $u$, and having slits $r$, for the passage of the prongs $a$. I also provide colters, $s$, which are sharp-blade cutters, (see Figs. 8, 9, and 10,) mounted on a bar, $t$, which is bolted to the front of the drag harrow-bar $u$. The position of the colters with respect to the teeth $u'$ of the drag-harrow is alternate, as shown in Figs. 9 and 10.

As shown in Fig. 8, the machine, with colters included, is adapted for preparing land for seeding, and for covering the seed where the latter has been sown broadcast by a hopper placed on the front of the machine.

Having described my invention, I claim and desire to secure by Letters Patent of the United States—

1. The combination of a land-roller, B, a frame, A, wholly supported by its rear end resting on the land-roller, and provided with a rigidly-attached draft-pole, a keeper or guide, $e$, on the side of the frame, an arm, F, below the frame, having one end pivoted to the forward part thereof, and extending back and provided at the rear end with an upward-projecting bar, F', which passes loosely through the said guide, an adjustable stop-block, $f$, provided with a vertical slot, $g$, and a bolt through the slot securing said stop at the upper end of the upward-projecting bar to limit the down movement of said bar without restricting its upward movement, and a harrow supported on the said pivoted arm F, as set forth.

2. The combination of a land-roller, B, a frame, A, wholly supported by its rear end resting on the land-roller, and provided with a rigidly-attached draft-pole, an arm, F, below the frame, having one end pivoted to the forward part thereof and extending back, a rotary harrow having its journals in bearings on said pivoted arm, a collar, $m$, loosely surrounding the harrow-cylinder at its center, and a treadle-lever, I, pivoted to the frame and having one end connected with the said collar, as set forth.

3. The combination of a land-roller, B, a frame, A, wholly supported by its rear end resting on the land-roller, and provided with a rigidly-attached draft-pole, an arm, F, below the frame, having one end pivoted to the forward part thereof and extending back, a drag-harrow, $u$, supported on said pivoted arm, and a rotary harrow having its journals in vertically-adjustable bearings $c$ on the pivoted arm, as and for the purpose set forth.

4. The combination of a land-roller, B, a frame, A, wholly supported by its rear end resting on the land-roller, and provided with a rigidly-attached draft-pole, an arm, F, below the frame, having one end pivoted to the forward part thereof and extending back, and a roller-scraper, L, on a cross-bar supported on said pivoted arm, as set forth.

5. The combination of a land-roller, B, a frame, A, wholly supported by its rear end resting on the land-roller, and provided with a rigidly-attached draft-pole, an arm, F, below the frame, having one end pivoted to the forward part thereof and extending back, a rotary harrow having its journals in bearings on said pivoted arm, and a metal plate, $q$, having slit $r$, for the passage of the harrow-prongs $a$, as set forth.

In testimony whereof I affix my signature in presence of two witnesses.

THOMAS R. CRANE.

Witnesses:
JOHN E. MORRIS,
JNO. T. MADDOX.